(12) United States Patent
Joo et al.

(10) Patent No.: US 11,836,305 B2
(45) Date of Patent: Dec. 5, 2023

(54) COOKING DEVICE AND CONTROL METHOD THEREFOR

(71) Applicant: SAMSUNG ELECTRONICS CO., LTD., Suwon-Si (KR)

(72) Inventors: Youngwoong Joo, Suwon-si (KR); Changsun Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/284,701

(22) PCT Filed: Nov. 12, 2019

(86) PCT No.: PCT/KR2019/015310
§ 371 (c)(1),
(2) Date: Apr. 12, 2021

(87) PCT Pub. No.: WO2020/101315
PCT Pub. Date: May 22, 2020

(65) Prior Publication Data
US 2021/0348766 A1 Nov. 11, 2021

(30) Foreign Application Priority Data
Nov. 16, 2018 (KR) .......................... 10-2018-0141738

(51) Int. Cl.
*G06F 3/0354* (2013.01)
*F24C 3/12* (2006.01)
(Continued)

(52) U.S. Cl.
CPC .......... *G06F 3/03547* (2013.01); *F24C 3/124* (2013.01); *F24C 3/128* (2013.01);
(Continued)

(58) Field of Classification Search
CPC .......... F24C 3/124; F24C 3/128; F24C 7/085; F24C 7/086; F24C 7/082; F24C 3/12;
(Continued)

(56) References Cited

U.S. PATENT DOCUMENTS 8,581,867 B2   11/2013   Shin et al.
8,963,008 B2    2/2015   Lai et al.
(Continued)

FOREIGN PATENT DOCUMENTS

CN   107728522 A    2/2018
EP   0 042 167      12/1981
(Continued)

OTHER PUBLICATIONS

International Search Report dated Feb. 20, 2020, in corresponding International Patent Application No. PCT/KR2019/015310.
(Continued)

*Primary Examiner* — Nitin Patel
*Assistant Examiner* — Saifeldin E Elnafia
(74) *Attorney, Agent, or Firm* — STAAS & HALSEY LLP

(57) ABSTRACT

A cooking device according to the present disclosure comprises: a heating device for heating a cooking material; an input device having a touch region receiving an input of a function command related to control of the heating device and a malfunction prevention region disposed around the touch region; and a processor for, when a user operation is input through the touch region, determining whether to perform the function command, and when the performing of the function command is determined, controlling the heating device so as to allow an operation corresponding to the function command to be performed, wherein the processor determines to perform a function command corresponding to the touch region when a user operation is input only to the
(Continued)

touch region, and determines not to perform the function command corresponding to the touch region when user operations for the touch region and the malfunction prevention region are input together.

9 Claims, 10 Drawing Sheets

(51) Int. Cl.
*G06F 3/0488* (2022.01)
*F24C 7/08* (2006.01)
*G06F 3/038* (2013.01)
*G06F 3/041* (2006.01)

(52) U.S. Cl.
CPC .............. *F24C 7/085* (2013.01); *F24C 7/086* (2013.01); *G06F 3/0383* (2013.01); *G06F 3/0416* (2013.01); *G06F 3/0488* (2013.01); *F24C 3/12* (2013.01); *F24C 7/082* (2013.01); *G06F 3/038* (2013.01)

(58) Field of Classification Search
CPC .. G06F 3/03547; G06F 3/0383; G06F 3/0416; G06F 3/0488; G06F 3/038; G06F 3/04164
See application file for complete search history.

(56) References Cited

U.S. PATENT DOCUMENTS

| | | | | |
|---|---|---|---|---|
| 2009/0061928 | A1* | 3/2009 | Lee | G06F 3/0362 455/556.1 |
| 2009/0267916 | A1* | 10/2009 | Hotelling | G06F 3/0443 345/174 |
| 2009/0303201 | A1* | 12/2009 | Isoda | F24C 7/082 345/173 |
| 2010/0187216 | A1 | 7/2010 | Komada et al. | |
| 2011/0199327 | A1* | 8/2011 | Shin | G06F 3/0418 345/173 |
| 2013/0264095 | A1* | 10/2013 | Lai | G06F 3/0446 174/126.1 |
| 2014/0123414 | A1 | 5/2014 | Okazaki | |
| 2014/0306909 | A1* | 10/2014 | Pedersen | G06F 3/03545 345/173 |
| 2016/0178215 | A1* | 6/2016 | Lee | F24C 7/086 426/231 |

FOREIGN PATENT DOCUMENTS

| | | |
|---|---|---|
| EP | 2 107 855 B1 | 3/2014 |
| JP | 2007-120857 A | 5/2007 |
| JP | 2009-054331 A | 3/2009 |
| JP | 2010-266133 A | 11/2010 |
| JP | 5117410 B2 | 1/2013 |
| JP | 5675324 B2 | 2/2015 |
| KR | 10-2008-0043170 A | 5/2008 |
| KR | 10-1206561 B1 | 11/2012 |
| KR | 10-2014-0125630 A | 10/2014 |

OTHER PUBLICATIONS

Written Opinion of the International Searching Authority dated Feb. 20, 2020, in corresponding International Patent Application No. PCT/KR2019/015310.
Extended European Search Report dated Nov. 8, 2021 issued by the European Patent Office for European Patent Application No. 19884115.7.
Office Action dated Oct. 21, 2022 issued in Korean Patent Application No. 10-2018-0141738.
Office Action dated Mar. 9, 2023 issued by the Korean Patent Office in Korean Patent Application No. 10-2018-0141738.
Office Action dated Mar. 17, 2023 issued by the European Patent Office in European Patent Application No. 19884115.7.

* cited by examiner

COOKING DEVICE AND CONTROL METHOD THEREFOR

CROSS-REFERENCE TO RELATED APPLICATIONS

This application is a U.S. National Stage Application which claims the benefit under 35 U.S.C. § 371 of International Patent Application No. PCT/KR2019/015310 filed on Nov. 12, 2019, which claims foreign priority benefit under 35 U.S.C. § 119 of Korean Patent Application 10-2018-0141738 filed on Nov. 16, 2018, in the Korean Intellectual Property Office, the contents of both of which are incorporated herein by reference.

TECHNICAL FIELD

The disclosure relates to a cooking device and a control method therefor, and more particularly, to a cooking device that has a malfunction prevention function, and a control method therefor.

DESCRIPTION OF THE RELATED ART

A cooking device is a home appliance that cooks a cooking material, and it may be a gas oven that heats a cooking material by combusting gas, an electric oven that heats a cooking material by converting electric energy into heat energy, a microwave oven that heats a cooking material by irradiating microwaves to a cooking material, a gas range that heats a container containing a cooking material by combusting gas, an induction device that heats a container containing a cooking material by generating a magnetic field, etc.

Recently, a cooking device includes a touch key, and receives an input of an operation command by using the touch key. However, there are cases wherein a touch key is operated by a relatively simple contact, and in case a cooking device operates differently from a user intention, a safety problem may occur. Accordingly, a method for preventing a malfunction of a cooking device is required.

DETAILED DESCRIPTION OF THE INVENTION

Technical Problem

The disclosure was devised in consideration of a problem as above, and provides a cooking device having an improved structure so as not to operate by an operation not intended by a user, and a control method therefor.

Technical Solution

A cooking device according to an aspect of the disclosure includes a heating device for heating a cooking material, an input device having a touch region receiving an input of a function command related to control of the heating device and a malfunction prevention region disposed around the touch region, and a processor for, based on a user operation being input through the touch region, determining whether to perform the function command, and based on the performing of the function command being determined, controlling the heating device so as to perform an operation corresponding to the function command, wherein the processor is configured to, based on a user operation being input only to the touch region, determine to perform a function command corresponding to the touch region, and based on user operations for the touch region and the malfunction prevention region being input together, determine not to perform the function command corresponding to the touch region.

The input device may include a touch sensor, and the touch region may be disposed in one region of the touch sensor, and the malfunction prevention region may be disposed in an outside region of the one region among the regions of the touch sensor.

The input device may include a first touch sensor having a predetermined shape, and a second touch sensor disposed around the first touch sensor, and the touch region may be the upper region of the first touch sensor, and the malfunction prevention region may be the upper region of the second touch sensor.

The first touch sensor and the second touch sensor may respectively output a signal value corresponding to an area touched by user, and the processor may, based on the signal value of the first touch sensor being greater than or equal to a predetermined first value, determine that a user operation for the touch region was input, and based on the signal value of the second touch sensor being greater than or equal to a second value bigger than the first value, determine that a user operation for the malfunction prevention region was input.

The input device may include a first touch sensor having a predetermined shape, and a plurality of second touch sensors disposed around the first touch sensor, and the touch region may be the upper region of the first touch sensor, and the malfunction prevention region may be the upper region of the plurality of second touch sensors.

The processor may, based on detecting a touch for at least one second touch sensor among the plurality of second touch sensors, determine that a user operation for the malfunction prevention region was input.

The plurality of second touch sensors may consist of three or more second touch sensors, and the processor may, based on detecting a touch for two or more second touch sensors among the plurality of second touch sensors, determine that a user operation for the malfunction prevention region was input.

The plurality of second touch sensors may be respectively formed to surround a part of the outside of the first touch sensor.

The plurality of second touch sensors may be formed to surround the edge regions of the first touch sensor.

The input device may include a plurality of first touch sensors having a predetermined shape and a plurality of second touch sensors disposed around the plurality of first touch sensors, and the touch region may be the upper region of the plurality of first touch sensors, and the malfunction prevention region may be the upper region of the plurality of second touch sensors.

The processor may, based on a user touch for the touch region touching all of the plurality of first touch sensors, determine that a user operation for the touch region was input, and based on a user touch for the malfunction prevention region touching greater than or equal to a predetermined number among the plurality of second touch sensors, determine that a user operation for the malfunction prevention region was input.

Also, a control method for a cooking device according to an aspect of the disclosure includes the steps of receiving an input of a user operation through an input device having a touch region receiving an input of a function command related to control of a heating device heating food and a malfunction prevention region disposed around the touch region, determining whether to perform a function command corresponding to the user operation, and based on the performing of the function command being determined, performing an operation corresponding to the function command, wherein, in the determining step, based on a user operation being input only to the touch region, it is determined to perform a function command corresponding to the touch region, and based on user operations for the touch region and the malfunction prevention region being input together, it is determined not to perform the function command corresponding to the touch region.

The malfunction prevention region may be divided into a plurality of malfunction prevention regions, and in the determining step, based on detecting a touch for at least one malfunction prevention region among the plurality of malfunction prevention regions, it may be determined that a user operation for the malfunction prevention region was input.

The plurality of malfunction prevention regions may consist of three or more malfunction prevention regions, and in the determining step, based on detecting a touch for two or more malfunction prevention regions among the plurality of malfunction prevention regions, it may be determined that a user operation for the malfunction prevention region was input.

In the performing step, the cooking device may be turned on or turned off according to the determined function command.

BEST MODE FOR IMPLEMENTING THE INVENTION

Mode for Implementing the Invention

Hereinafter, embodiments of a cooking device and a control method therefor according to the disclosure will be described in detail with reference to the accompanying drawings.

The embodiments described below are exemplary embodiments for promoting understanding of the disclosure, and it should be noted that the disclosure may be implemented while being modified in various forms, unlike the embodiments described herein. Meanwhile, in explaining the disclosure below, in case it is determined that detailed explanation of related known functions or components may unnecessarily confuse the gist of the disclosure, the detailed explanation and detailed illustration will be omitted. Also, in the accompanying drawings, some components may not be illustrated according to their actual sizes, but they may be illustrated in exaggerated sizes, for promoting understanding of the disclosure.

Meanwhile, terms such as "first," "second" and the like may be used to describe various components, but the components are not intended to be limited by the terms. The terms are used only to distinguish one component from another component. For example, a first component may be called a second component, and a second component may be called a first component in a similar manner, without departing from the scope of the disclosure.

Also, the terms used in the embodiments of the disclosure may be interpreted as meanings generally known to those of ordinary skill in the art described in the disclosure, unless defined differently in the disclosure.

In addition, the terms 'front end,' 'rear end,' 'upper part,' 'lower part,' 'upper end,' 'lower end,' etc. used in the disclosure are defined based on the drawings, and the form and the location of each component are not to be limited by the terms.

Hereinafter, embodiments according to the disclosure will be described in detail with reference to the accompanying drawings.

Figure 1:
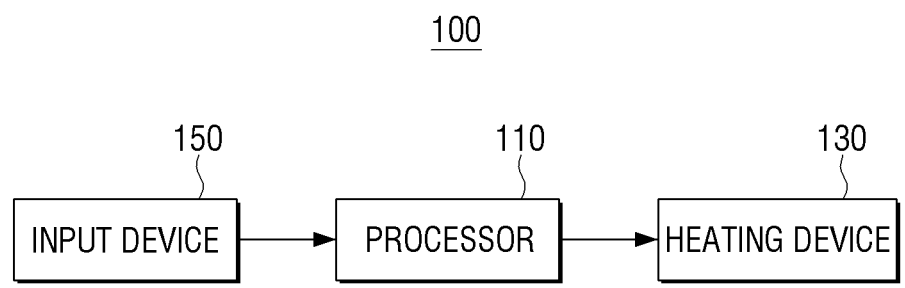
FIG. 1 is a block diagram illustrating a schematic configuration of a cooking device according to an embodiment of the disclosure.

FIG. 1 is a block diagram illustrating a schematic configuration of a cooking device according to an embodiment of the disclosure.

Referring to FIG. 1, a cooking device 100 may consist of an input device 150, a heating device 130, and a processor 110.

The input device 150 may receive various inputs related to control of the cooking device 100. Specifically, the input device 150 may have a touch region receiving an input of a function command related to control of the heating device 130 and a malfunction prevention region disposed around the touch region. Here, a function command may be a turn-on/turn-off instruction, the strength, the timer, etc. of the cooking device 100.

The touch region is an region for receiving an input of a main function of the input device, and the malfunction prevention region is an region for distinguishing whether a touch for the aforementioned touch region is a touch intended by a user or a touch not intended by a user. Forms and functions of the touch region and the malfunction prevention region will be described later.

Meanwhile, the aforementioned input device 150 may be a touch pad having a predetermined size. Specifically, a predetermined region of the touch pad may operate as the aforementioned touch region, and an outside region around the touch region may operate as the malfunction prevention region.

Also, the input device 150 may consist of a plurality of touch sensors. For example, the input device 150 may consist of a first touch sensor having a predetermined shape and a second touch sensor disposed around the aforementioned first touch sensor. Here, the predetermined shape may be a circular shape, but it is not limited thereto. Also, the second touch sensor may be constituted as one touch sensor, or constituted as a plurality of touch sensors.

The shapes and the operation method of the touch region and the malfunction prevention region of the input device 150 will be described later.

The input device 150 may receive an input of a function command related to control of the heating device 130 from a user, and output an electronic signal corresponding to the function command input from the user to the processor 110.

The heating device 130 may include a heater heating the inside of a kitchen by combusting gas, a cooktop heating a cooking material by converting electric energy into heat energy, a microwave generator irradiating microwaves to the inside of a kitchen, and a steam generator emitting heated stem to the inside of a kitchen.

However, the heating device 130 may not include all of a heater, a cooktop, a microwave generator, and a steam generator, but depending on the type of the cooking device 100, the heating device 130 may include at least one of a heater, a cooktop, a microwave generator, or a steam generator.

The processor 110 may control the operation of the cooking device 100. Specifically, if a function command is input from the input device 150, the processor 110 determines whether to perform the input function command, and controls respective components inside the cooking device 100 so that an operation corresponding to the determined function command is performed.

For this, if a user operation is input through the input device 150, the processor 110 determines whether the user operation is an intended operation or an unintended operation. Specifically, if a user operation is input only to the touch region, the processor 110 may determine that the user operation is an intended operation, and if operations are input not only to the touch region but also to the malfunction prevention region together, the processor 110 may determine that the user operations are unintended operations.

For example, in the case of a user's operation, a touch operation touching only the touch region of the input device relatively precisely may be performed. However, in the case of a touch to the input device by a pet such as a dog or a cat, there is high possibility that not only the touch region but also the malfunction prevention region may be touched together.

In case the touch region and the malfunction prevention region are touched together as above, the processor 110 may distinguish the operation as an operation not intended by a user, and may not perform an input function command.

Accordingly, danger that may occur as the cooking device 100 malfunctions differently from a user intention can be prevented.

The input device 150 according to an embodiment of the disclosure includes a malfunction prevention region that distinguishes whether a user operation is an intended operation or an unintended operation when a user operation is input, and thus it can prevent the cooking device from operating differently from the user intention.

Meanwhile, in the above, only simple components constituting the cooking device were illustrated and described, but in actual implementation, various components may be additionally provided. Explanation in this regard will be made below with reference to FIG. 2.

Hereinafter, a detailed configuration of the cooking device 100 will be described.

Figure 2:
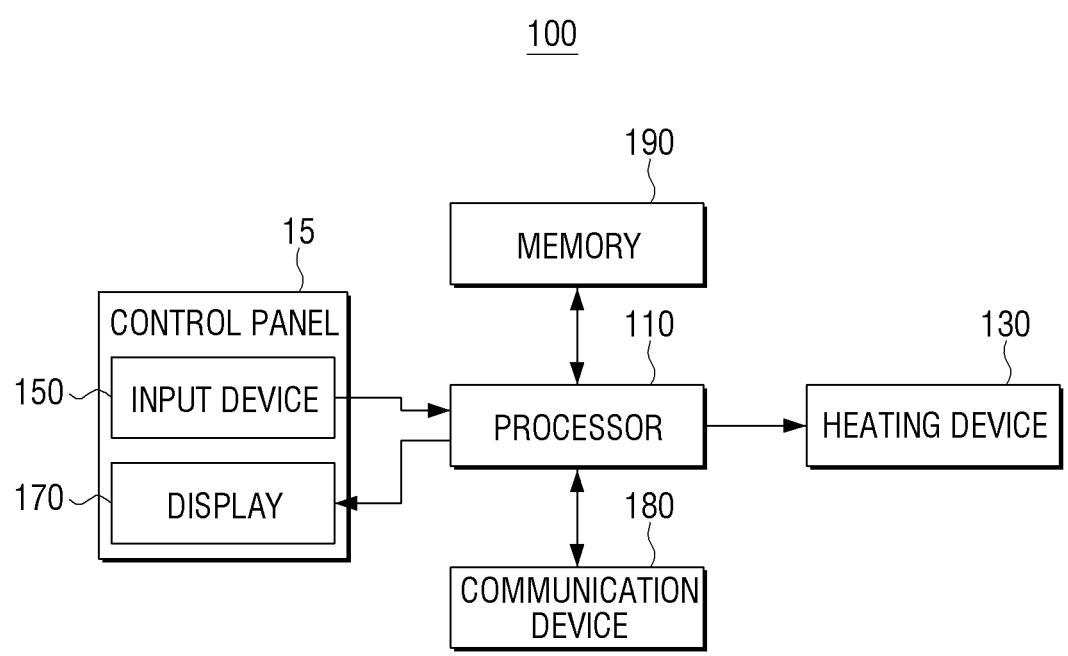
FIG. 2 is a block diagram illustrating a detailed configuration of a cooking device according to an embodiment of the disclosure.

FIG. 2 is a block diagram illustrating a detailed configuration of a cooking device according to an embodiment of the disclosure.

Referring to FIG. 2, the cooking device 100 may include a control panel 15, a heating device 130, a communication device 180, a memory 190 storing control data of the cooking device 100, and a processor 110 controlling the operation of the cooking device 100.

The control panel 15 may include an input device 150 and a display 170. The control panel 15 may include an input device 150 consisting of a plurality of buttons and a keypad, etc. that enables a user to set various conditions of the cooking device 100, and a user interface wherein a display 170 displaying various information of the cooking device 100 is provided.

The input device 150 may have a touch region receiving an input of a function command related to control of the heating device 130 and a malfunction prevention region disposed around the touch region.

The display 170 may visually display operation information of the cooking device 100 to a user according to a control signal of the processor 110.

The heating device 130 operates only in a case intended by a user by the input device 150 including a malfunction prevention region for distinguishing whether a user operation is an intended operation or an unintended operation. The heating device 130 does not operate differently from a user intention, and thus it can increase the safety of the cooking device 100.

The communication device 180 may include a communication module communicating with an external electronic device by using various communication protocols.

The memory 190 may store a program and data for controlling the cooking device 100.

The memory 190 may store a control program and control data for controlling the cooking device 100, or memorize an input of a user operation and a function command input through the input device 150, a control signal output by the processor 110, etc.

The processor 110 may process a set value, a function command, etc. according to the control program and control data memorized in the memory 190, and output a control signal controlling the heating device 130 and a communication signal for communicating with an external electronic device.

For example, if a function command is input from the input device 150, the processor 110 may control the components of the cooking device 100 to turn on or turn off the cooking device 100 according to the input function command. Also, the processor 110 may control the heating device 130 such that the heating device 130 operates or the operation of the heating device 130 is stopped according to the input function command.

Figure 3:
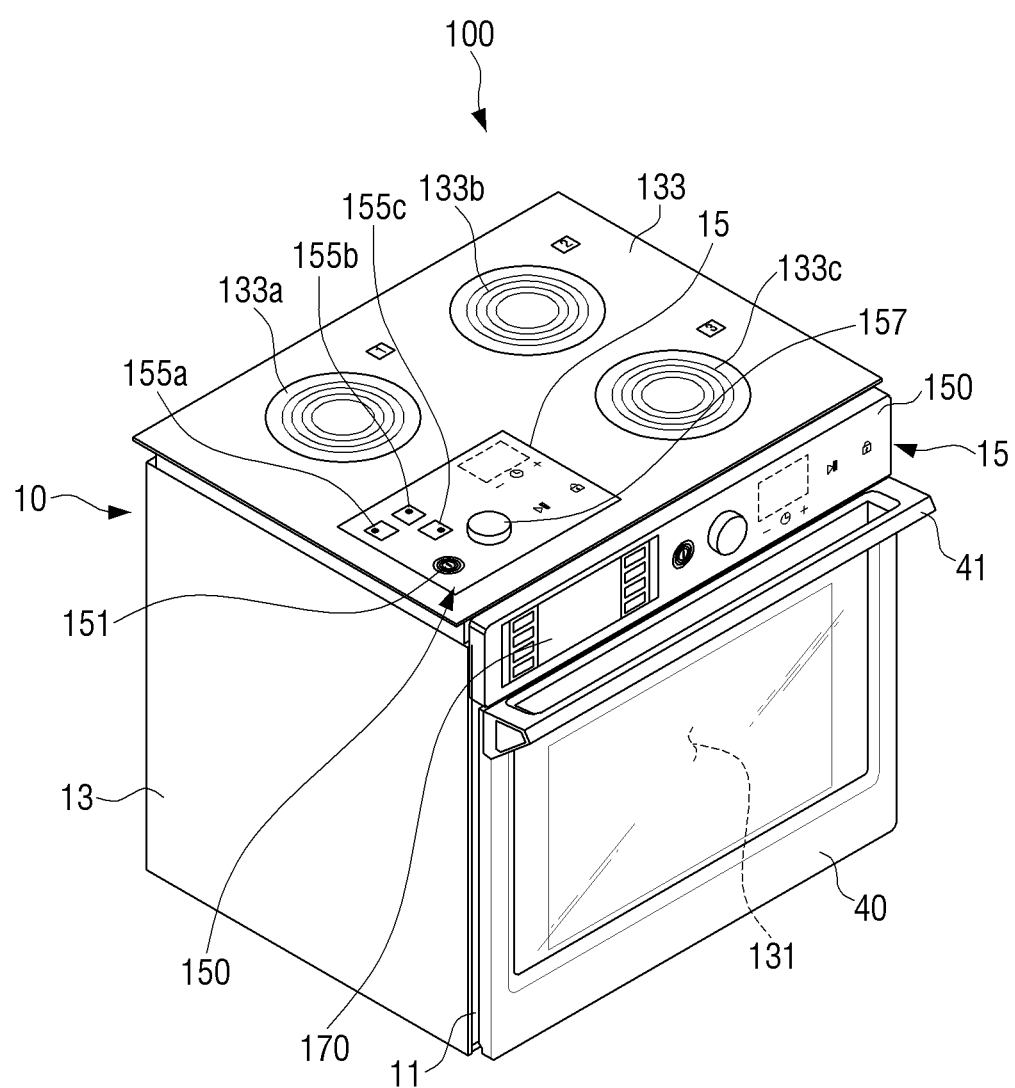
FIG. 3 is a perspective view of a cooking device according to an embodiment of the disclosure.

FIG. 3 is a perspective view of a cooking device according to an embodiment of the disclosure.

Referring to FIG. 3, the cooking device 100 may include a main body 10 forming the exterior, an oven 131 located on the inner side of the main body 10, and at least one cooktop 133a, 133b, 133c that is provided on the upper end of the cooking device 100 and on which a container containing a cooking material can be placed and heated.

The heating device 130 may include a heater constituting the oven 131 and at least one cooktop 133a, 133b, 133c constituting an induction 133.

In case the cooking device 100 is an oven, the heating device 130 may include a heater, and in case the cooking device 100 is an induction, the heating device 130 may include a cooktop, and in case the cooking device 100 is a microwave oven, the heating device 130 may include a microwave generator, and in case the cooking device 100 is a steam oven, the heating device 130 may include a steam generator.

The main body 10 may include a front surface panel 11 forming the front surface of the main body 10, and a side surface panel 13 forming the side surface of the main body 10.

The oven 131 may be provided on the inner side of the main body 10 in the form of a box, and the front surface of the oven 131 may be opened so that a cooking material can be accommodated. Inside the oven 131, a heater heating a cooking material may be provided. The opened front surface of the oven 131 may be opened and closed by the door 40. The door 40 may be hinge coupled to the lower side of the main body 10 so that it can rotate with respect to the main body 10.

In the upper end part of the front surface of the door 40, a knob 41 that a user can grip may be provided so that the door 40 can be opened and closed easily.

On the cooktop 133 of the main body, an input device 150 that can make various kinds of inputs regarding control of the cooking device 100 and a control panel 15 including a display 170 displaying various information of the cooking device 100 may be arranged.

The control panel 15 may not only be formed on the cooktop 133 of the main body as illustrated in FIG. 3, but also be formed in the upper part of the front surface panel 11, but the disclosure is not limited thereto, and the control panel 15 may be provided on one side surface of the main body.

The control panel 15 formed in the upper part of the front surface panel 11 may include an input device 150 that can receive an input of a function command related to control of the heating device of the oven 131, and the control panel 15 formed on the cooktop 133 may include an input device 150 that can receive an input of a function command related to control of the heating device of the induction 133.

The disclosure can be applied to all home appliances including an input device. Home appliances may include a cooking device to which an input device is applied. Also, a home appliance may be specified as a cooking device.

The control panel 15 for inputting a function command to the oven 131 and the control panel 15 for inputting a function command to the induction 133 may include the same components.

For the convenience of explanation, the control panel 15 formed on the cooktop 133 will be explained below, and explanation of the control panel 15 formed in the upper part of the front surface panel 11 will be replaced by the explanation of the control panel 15 formed on the cooktop 133.

The control panel 15 may not only include an input device 150 formed of a touch method but also further include a plurality of operation buttons and a dial 157, etc. through which various kinds of inputs related to control of the cooking device 100 can be received.

The input device 150 may include a power key 151 for turning on or turning off the cooking device 100, and a plurality of selection keys 155a, 155b, 155c for selecting cooktops 133a, 133b, 133c which are subjects for adjusting heating temperatures and heating time among a plurality of cooktops 133a, 133b, 133c.

The dial 157 may adjust the heating temperature or heating time of the heating device 130 by a rotation.

The power key 151 and the plurality of selection keys 155a, 155b, 155c may respectively include a touch region for receiving inputs of function commands corresponding to the respective keys, and a malfunction prevention region for distinguishing whether a touch for the touch region is a touch intended by a user or a touch not intended by a user.

If a turn-on or turn-off instruction of the cooking device 100 is input from the power key 151, the processor 110 may determine whether to perform the input turn-on or turn-off instruction, and control the components inside the cooking device 100 so that an operation corresponding to the determined turn-on or turn-off instruction is performed.

Also, the processor 130 may receive an input of a command selecting the heating device 130 which becomes a subject for adjusting the heating temperature and the heating time among the plurality of heating devices 133a, 133b, 133c from the plurality of selection keys 155a, 155b, 155c. For example, if a selection command selecting the first cooktop 133a is input from the selection key 155a, the processor 110 may determine whether to perform the input selection command for the first cooktop 133a, and control the heating device 130 so that an operation corresponding to the determined selection command is performed.

After the processor 110 receives an input of a function command, the processor 110 may determine whether a user operation input through the input device 150 is an operation intended by a user or an operation not intended by a user in a process of determining whether to perform the function command.

Specifically, if a user operation is input only to the touch region, the processor 110 may determine that the user operation is an intended operation, and if user operations are input not only to the touch region but also to the malfunction prevention region together, the processor 110 may determine that the user operations are unintended operations.

Accordingly, the cooking device 100 according to an embodiment of the disclosure may prevent the cooking device 100 from operating differently from a user intention by the input device 150 including a malfunction prevention region for distinguishing whether a user operation is an intended operation or an unintended operation, and may thereby improve the safety of the cooking device 100.

The specific arrangement structures of the touch region and the malfunction prevention region that will be described below will be explained as the shape of the power key 151 which is a component of the input device 150.

Hereinafter, the input device 150 will be explained as the shape of the power key 151, but the disclosure is not limited thereto, and the arrangement structure of the input device 150 may be applied to the plurality of selection keys 155a, 155b, 155c.

The characteristics and the control method for the cooking device 100 using the input device 150 according to various embodiments will be described below with reference to FIGS. 4 to 9.

Figure 4:
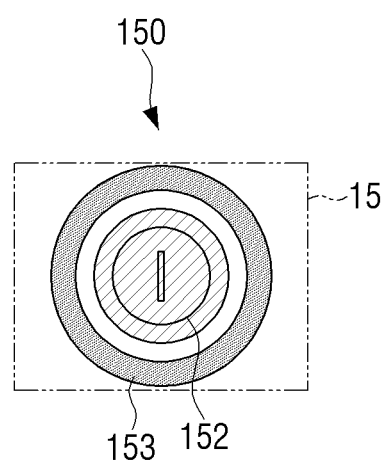
FIGS. 4 to 9 are diagrams illustrating parts of a control panel for illustrating an input device according to various embodiments of the disclosure.

FIG. 4 is a diagram illustrating a part of a control panel of a cooking device according to an embodiment of the disclosure.

Referring to FIG. 4, the input device 150 of the cooking device 100 according to an embodiment of the disclosure may include a touch region 152 for receiving an input of a main function of the input device and a malfunction prevention region 153 for distinguishing whether a touch for the touch region is a touch intended by a user or a touch not intended by a user.

The touch region 152 may be arranged in the center of the input device 150, and the malfunction prevention region 153 may be formed to surround the outer circumference of the touch region 152.

The touch region 152 may be formed as a circular shape, and the malfunction prevention region 153 may be formed as a ring shape having a bigger diameter than the diameter of the touch region 152 so that the touch region 152 is arranged inside the malfunction prevention region 152.

The malfunction prevention region 153 may be arranged to be distanced from the touch region 152 by a specific interval.

The input device 150 according to an embodiment of the disclosure may include a touch pad outputting a touch coordinate. The touch region 152 may be arranged in one region of the touch pad, and the malfunction prevention region 153 may be arranged in an outside region of the one region among the regions of the touch pad.

If a user touches the input device 150, the processor 110 may detect a touch coordinate output from the input device 150, and compare the detected touch coordinate with the touch region 152 and the malfunction prevention region 153, and thereby determine whether the input of a user operation input by the user was input only to the touch region 152, or was input into the touch region 152 and the malfunction prevention region 153 together.

In case the detected touch coordinate corresponds only to the touch region 152, the processor 110 may determine to perform a function command corresponding to the touch region 152, and control the heating device 130 to perform an operation corresponding to the function command.

Meanwhile, in case the detected touch coordinate corresponds not only to the touch region 152 but also to the malfunction prevention region 153, the processor 110 may determine to not perform a function command corresponding to the touch region 152.

If a touch is detected on the input device 150, the heating device 130 may or may not operate according to an output touch coordinate. If the output touch coordinate corresponds only to the touch region 152, the heating device 130 may operate to perform a function command corresponding to the touch region.

However, if the output touch coordinate corresponds not only to the touch region 152 but also to the malfunction prevention region 153, the heating device 130 may not perform a function command corresponding to the touch region.

In the input device 150 according to another embodiment of the disclosure, the touch region 152 and the malfunction prevention region 153 may be constituted as separate independent touch sensors.

The input device 150 may include a first touch sensor having a predetermined shape and a second touch sensor disposed around the first touch sensor. The upper region of the first touch sensor may correspond to the touch region 152, and the upper region of the second touch sensor may correspond to the malfunction prevention region 153.

The first touch sensor may be formed as a circular shape so as to correspond to the touch region 152, and the second touch sensor may be formed as a ring shape surrounding the outer circumference of the touch region 152 so as to correspond to the malfunction prevention region 153.

The first touch sensor and the second touch sensor may respectively output a signal value corresponding to an area touched by user.

If the signal value of the first touch sensor is greater than or equal to a predetermined first value, the processor 110 may determine that a user operation was input to the touch region 152.

If the signal value of the second touch sensor is greater than or equal to a predetermined second value, the processor 110 may determine that a user operation was input to the malfunction prevention region 153. In this case, the predetermined second value of the second touch sensor may be set as a bigger value than the predetermined first value of the first touch sensor.

If a touch is detected on the input device 150, the heating device 130 may or may not operate according to the touch sensor that detected the touch. If the detected touch is detected only at the first touch sensor corresponding to the touch region 152, the heating device 130 may operate to perform a function command corresponding to the touch region.

However, if the detected touch is detected not only at the first touch sensor corresponding to the touch region 152 but also at the second touch sensor corresponding to the malfunction prevention region 153 together, the heating device 130 may not perform a function command corresponding to the touch region.

In the case of an operation intended by a user, the operation touches only the touch region 152 of the input device 150 relatively precisely, and thus it may be distinguished whether a touch on the input device 150 is a touch intended by a user or a touch not intended by a user through the malfunction prevention region 153 arranged to be adjacent to the touch region 152.

Accordingly, the cooking device 100 does not operate by a touch not intended by a user such as a touch by a paw or a tongue of a pet or a touch by a user's mistake, and thus a malfunction by an operation not intended by a user can be prevented.

Figure 5:
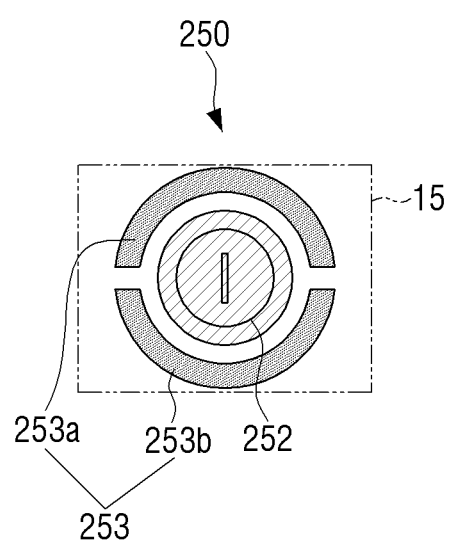

FIG. 5 is a diagram illustrating a part of a control panel of a cooking device according to another embodiment of the disclosure.

Referring to FIG. 5, most components of the input device 250 of the cooking device according to another embodiment of the disclosure are identical to those of the input device 150 illustrated in FIG. 4, but there is a difference in that a plurality of malfunction prevention regions 253 are formed. Accordingly, regarding the components of the input device 250 according to another embodiment of the disclosure that overlap with those of the input device 150 illustrated in FIG. 4, detailed explanation will be omitted, and the malfunction prevention regions 253 that have a difference will be mainly explained.

The touch region 252 may be arranged in the center of the input device 250, and the malfunction prevention regions 253 may be formed to surround a part of the outside of the touch region 252.

The touch region 252 may be formed as a circular shape, and the malfunction prevention regions 253 may consist of a first malfunction prevention region 253a surrounding a part of the upper side of the touch region 252 and a second malfunction prevention region 253b surrounding a part of the lower side of the touch region 252.

The first malfunction prevention region 253a and the second malfunction prevention region 253b are illustrated to respectively surround a part of the upper side and a part of the lower side of the touch region 252, but the disclosure is not limited thereto, and the first malfunction prevention region 253a may be formed to surround a part of the left side of the touch region 252, and the second malfunction prevention region 253b may be formed to surround a part of the right side of the touch region 252.

The outer circumference of the touch region 252 may be surrounded by the first malfunction prevention region 253a and the second malfunction prevention region 253b.

The first malfunction prevention region 253a and the second malfunction prevention region 253b may be arranged to be distanced from each other by a specific interval.

The malfunction prevention regions 253 of the input device 250 may consist of a plurality of separate independent touch sensors.

The input device 250 may include a predetermined first touch sensor and a plurality of second touch sensors disposed around the first touch sensor. The upper region of the first touch sensor may correspond to the touch region 252, and the upper regions of the plurality of second touch sensors may correspond to the malfunction prevention regions 253.

*The first touch sensor may be formed as a circular shape so as to correspond to the touch region 252. The plurality of second touch sensors may be formed to surround a part of the outside of the touch region 252 so as to respectively correspond to the malfunction prevention regions 253a, 253b.

If a touch for at least one malfunction prevention region 253a, 253b among a plurality of malfunction prevention regions 253a, 253b is detected, the processor 110 may determine that a user operation for the malfunction prevention regions 253 was input.

For example, if a user simultaneously touches the touch region 252 and the first malfunction prevention region 253a, the processor 110 may determine that user operations for the touch region 252 and the malfunction prevention regions 253 were input together, and the cooking device 100 may not perform a function command corresponding to the touch region 252.

If a touch is detected on the input device 250, the heating device 130 may or may not operate according to the touch sensor that detected the touch. If the detected touch is detected only at the first touch sensor corresponding to the touch region 252, the heating device 130 may operate to perform a function command corresponding to the touch region.

However, if the detected touch is detected not only at the touch region 252 but also at the second touch sensor corresponding to at least one malfunction prevention region 253a, 253b among the plurality of second touch sensors corresponding to the plurality of malfunction prevention regions 253a, 253b, the heating device 130 may not perform a function command corresponding to the touch region.

Figure 6:
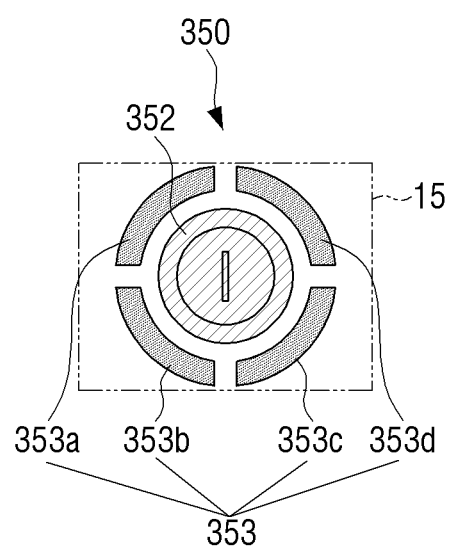

FIG. 6 is a diagram illustrating a part of a control panel of a cooking device according to still another embodiment of the disclosure.

Referring to FIG. 6, most components of the input device 350 of the cooking device according to another embodiment of the disclosure are identical to those of the input device 250 illustrated in FIG. 5, but there is a difference in that a plurality of malfunction prevention regions 353 in a number of three or more are formed. Accordingly, regarding the components of the input device 350 according to another embodiment of the disclosure that overlap with those of the input device 250 illustrated in FIG. 5, detailed explanation will be omitted, and the malfunction prevention regions 353 that have a difference will be mainly explained.

The touch region 352 may be arranged in the center of the input device 350, and the malfunction prevention regions 353 may be formed to surround a part of the outside of the touch region 352.

The malfunction prevention regions 353 may consist of a first malfunction prevention region 353a, a second malfunction prevention region 353b, a third malfunction prevention region 353c, and a fourth malfunction prevention region 353d that quadrisected the outer circumference of the touch region 352.

In FIG. 6, it was described that four malfunction prevention regions 353a, 353b, 353c, 353d are constituted, but the disclosure is not limited thereto, and the malfunction prevention regions 353 may be constituted as a plurality of malfunction prevention regions in a number of three or more.

The malfunction prevention regions 353 may consist of a first malfunction prevention region 353a surrounding the left upper part of the touch region 352, a second malfunction prevention region 353b surrounding the left lower part of the touch region 352, a third malfunction prevention region 353c surrounding the right lower part of the touch region 352, and a fourth malfunction prevention region 353d surrounding the right upper part of the touch region 352.

However, the shapes of the first, second, third, and fourth malfunction prevention regions 353a, 353b, 353c, 353d are not limited thereto, and the plurality of malfunction prevention regions 353a, 353b, 353c, 353d may be formed to surround the vicinity of the touch region 352.

The outer circumference of the touch region 352 may be surrounded by the first malfunction prevention region to the fourth malfunction prevention region 353a, 353b, 353c, 353d.

The plurality of malfunction prevention regions 353a, 353b, 353c, 353d may be respectively arranged to be distanced from one another by a specific interval.

The malfunction prevention regions 353a, 353b, 353c, 353d of the input device 350 may consist of a plurality of separate independent touch sensors.

The input device 350 may include a predetermined first touch sensor and a plurality of second touch sensors disposed around the first touch sensor. The upper region of the first touch sensor may correspond to the touch region 352, and the upper regions of the plurality of second touch sensors may respectively correspond to the malfunction prevention regions 353a, 353b, 353c, 353d. In this case, the second touch sensors may be constituted in a number of three or more.

If a touch for two or more malfunction prevention regions 353 among the plurality of malfunction prevention regions in a number of three or more 353a, 353b, 353c, 353d is detected, the processor 110 may determine that a user operation for the malfunction prevention regions 353 was input.

For example, if the touch region 352 and the first malfunction prevention region 353a are simultaneously touched, the processor 110 may determine that a user operation for the malfunction prevention regions 353 was not input. Thus, the processor 110 may determine that a user operation was input only to the touch region 352, and the cooking device 100 may perform a function command corresponding to the touch region 352.

Meanwhile, if the touch region 352, the first malfunction prevention region 353a, and the second malfunction prevention region 353b are simultaneously touched, the processor 110 may determine that user operations for the touch region 352 and the malfunction prevention regions 353 were input together, and the cooking device 100 may not perform a function command corresponding to the touch region 352.

If a touch is detected on the input device 350, the heating device 130 may or may not operate according to the touch sensor that detected the touch. If the detected touch is detected only at the first touch sensor corresponding to the touch region 352, the heating device 130 may operate to perform a function command corresponding to the touch region.

However, if the detected touch is detected not only at the first touch sensor corresponding to the touch region 352 but also at the second touch sensor corresponding to at least two malfunction prevention regions 353a, 353b, 353c, 353d among the plurality of second touch sensors corresponding to the plurality of malfunction prevention regions 353a, 353b, 353c, 353d together, the heating device 130 may not perform a function command corresponding to the touch region.

It was described that, if a touch is detected in at least two malfunction prevention regions among the plurality of malfunction prevention regions 353a, 353b, 353c, 353d, a user operation was input to the malfunction prevention regions. However, the disclosure is not limited thereto, and if a touch is detected in malfunction prevention regions greater than or equal to a predetermined number among a plurality of malfunction prevention regions, it can be deemed that a user operation was input in the malfunction prevention regions.

Figure 7:
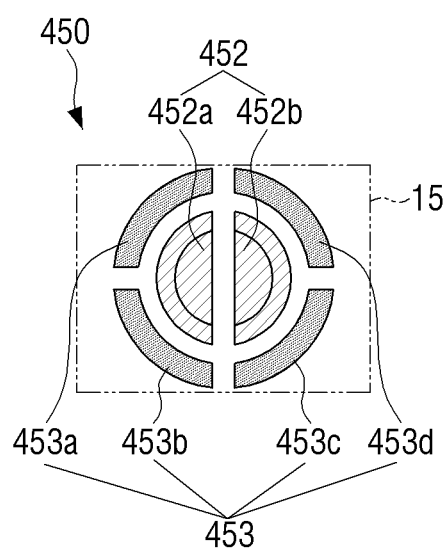

FIG. 7 is a diagram illustrating a part of a control panel of a cooking device according to still another embodiment of the disclosure.

Referring to FIG. 7, most components of the input device 450 of the cooking device according to another embodiment of the disclosure are identical to those of the input device 350 illustrated in FIG. 6, but there is a difference in that a plurality of touch regions 452 are formed. Accordingly, regarding the components of the input device 450 according to another embodiment of the disclosure that overlap with those of the input device 350 illustrated in FIG. 6, detailed explanation will be omitted, and the touch regions 452 that have a difference will be mainly explained.

The touch regions 452 may be arranged in the center of the input device 450, and the malfunction prevention regions 453 may be formed to surround a part of the outside of the touch regions 452.

The touch regions 452 may consist of a first touch region 452a and a second touch region 452b formed as a semicircular shape. The touch regions 452 consisting of the first touch region 452a and the second touch region 452b may be formed as a circular shape.

In FIG. 6, it was described that the touch regions 452 consist of two regions of the first touch region 452a and the second touch region 452b, but the disclosure is not limited thereto, and the touch regions 452 may consist of a plurality of touch regions surrounded by the malfunction prevention regions 453.

The plurality of malfunction prevention regions 453 may be formed to surround the plurality of touch regions 452a, 452b. The outer circumference of the touch regions 452 may be surrounded by the first malfunction prevention region to the fourth malfunction prevention region (453a, 453b, 453c, 453d).

The plurality of first touch region 452a and second touch region 452b may be arranged to be distanced from each other by a specific interval.

The touch regions 452a, 452b and the malfunction prevention regions 453a, 453b, 453c, 453d of the input device 450 may consist of a plurality of separate independent touch sensors.

The input device 450 may include a plurality of first touch sensors having a predetermined shape and a plurality of second touch sensors disposed around the first touch sensors. The upper regions of the plurality of first touch sensors may respectively correspond to the plurality of touch regions 452a, 452b, and the upper regions of the plurality of second touch sensors may respectively correspond to the plurality of malfunction prevention regions 453a, 453b, 453c, 453d.

If a touch for all of the plurality of touch regions 452a, 452b is detected, the processor 110 may determine that a user operation for the touch region 452 was input.

For example, if the first touch region 452a and the first malfunction prevention region 453a are simultaneously touched, the processor 110 determines that a user operation for the touch region 452 was not input, and thus the cooking device 100 may not perform a function command corresponding to the touch region 452.

Meanwhile, if the first touch region 452a, the second touch region 452b, and the first malfunction prevention region 453a are simultaneously touched, the processor 110 determines that a user operation for the touch region 452 was input, and determines that a user operation for the malfunction prevention region 453 was not input, and thus the cooking device 100 may perform a function command corresponding to the touch region 452.

Meanwhile, if the first touch region 452a and the second touch region 452b, and the first malfunction prevention region 453a and the second malfunction prevention region 453b are simultaneously touched, the processor 110 determines that user operations for the touch region 452 and the malfunction prevention region 453 were input together, and thus the cooking device 100 may not perform a function command corresponding to the touch region 452.

If a touch is detected on the input device 450, the heating device 130 may or may not operate according to the touch sensor that detected the touch. If the detected touch is detected only at all of the plurality of first touch sensors corresponding to the plurality of touch regions 452a, 452b, the heating device 130 may operate to perform a function command corresponding to the touch region.

However, if the detected touch is detected not only at the plurality of first touch sensors corresponding to the plurality of touch regions 452a, 452b but also at the second touch sensor corresponding to at least one malfunction prevention region 453a, 453b, 453c, 453d among the plurality of second touch sensors corresponding to the plurality of malfunction prevention regions 453a, 453b, 453c, 453d together, the heating device 130 may not perform a function command corresponding to the touch region.

Figure 8:
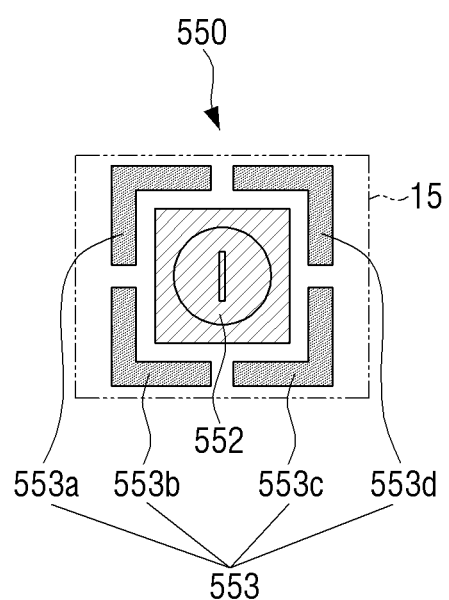

FIG. 8 is a diagram illustrating a part of a control panel of a cooking device according to still another embodiment of the disclosure.

Referring to FIG. 8, most components of the input device 550 of the cooking device according to another embodiment of the disclosure are identical to those of the input device 150 illustrated in FIG. 4, but there are differences in the shape of the touch region 552 and the arrangement structure of the malfunction prevention regions 553. Accordingly, regarding the components of the input device 550 according to another embodiment of the disclosure that overlap with those of the input device 150 illustrated in FIG. 4, detailed explanation will be omitted, and the shape of the touch region 552 and the arrangement structure of the malfunction prevention regions 553 that are different will be mainly explained.

The touch region 552 may be arranged in the center of the input device 550, and the malfunction prevention regions 553 may be formed to surround a part of the outside of the touch region 552.

The touch region 552 may be formed as a rectangle. The malfunction prevention regions 553 may consist of a first malfunction prevention region 553a, a second malfunction prevention region 553b, a third malfunction prevention region 553c, and a fourth malfunction prevention region 553d surrounding the edge regions of the touch region 552.

The edge regions of the touch region 552 may be surrounded by the plurality of malfunction prevention regions 553a, 553b, 553c, 553d. The first to fourth malfunction prevention regions 553a, 553b, 553c, 553d may be arranged to be distanced from one another by a specific interval.

The malfunction prevention regions 553a, 553b, 553c, 553d of the input device 550 may consist of a plurality of separate independent touch sensors.

The input device 550 may include a predetermined first touch sensor and a plurality of second touch sensors disposed around the first touch sensor. The upper region of the first touch sensor may correspond to the touch region 552, and the upper regions of the plurality of second touch sensors may respectively correspond to the malfunction prevention regions 553a, 553b, 553c, 553d.

The first touch sensor may be formed as a rectangular shape so as to correspond to the touch region 552. The plurality of second touch sensors may respectively be formed to surround the edge regions of the touch region 552 so as to correspond to the malfunction prevention regions 553a, 553b, 553c, 553d.

If a touch for at least one malfunction prevention region 553 among the plurality of malfunction prevention regions 553a, 553b, 553c, 553d is detected, the processor 110 may determine that a user operation for the malfunction prevention region 553 was input.

For example, if the touch region 552 and the first malfunction prevention region 553a are simultaneously touched, the processor 110 determines that user operations for the touch region 552 and the malfunction prevention region 553 were input together, and thus the cooking device 100 may not perform a function command corresponding to the touch region 552.

Meanwhile, if a touch for at least two malfunction prevention regions 553 among the plurality of malfunction prevention regions 553a, 553b, 553c, 553d is detected, the processor 110 may determine that a user operation for the malfunction prevention region 553 was input.

In this case, even if the touch region 552 and the first malfunction prevention region 553a are simultaneously touched, the processor 110 determines that a user operation was input only to the touch region 552, and thus the cooking device 100 may perform a function command corresponding to the touch region 552.

In case the touch region 552, the first malfunction prevention region 553a, and the second malfunction prevention region 553b are simultaneously touched, the processor 110 determines that user operations for the touch region 552 and the malfunction prevention region 553 were input together, and thus the cooking device 100 may not perform a function command corresponding to the touch region 552.

Figure 9:
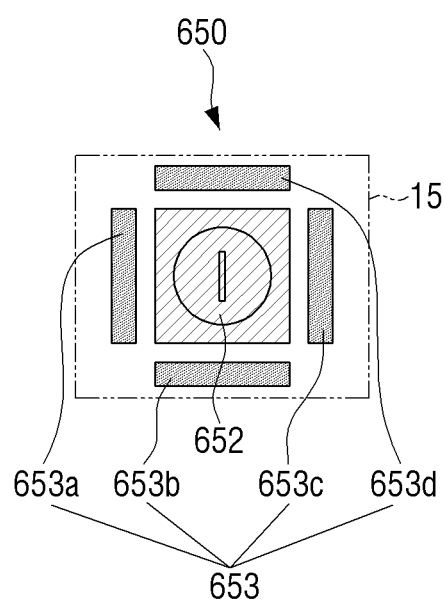

FIG. 9 is a diagram illustrating a part of a control panel of a cooking device according to still another embodiment of the disclosure.

Referring to FIG. 9, most components of the input device 650 of the cooking device according to another embodiment of the disclosure are identical to those of the input device 550 illustrated in FIG. 8, but there is a difference in the arrangement structure of the malfunction prevention regions 653. Accordingly, regarding the components of the input device 650 according to another embodiment of the disclosure that overlap with those of the input device 550 illustrated in FIG. 8, detailed explanation will be omitted, and the arrangement structure of the malfunction prevention regions 653 that has a difference will be mainly explained.

The touch region 652 may be formed as a rectangle. The malfunction prevention regions 653 may consist of a first malfunction prevention region 653a, a second malfunction prevention region 653b, a third malfunction prevention region 653c, and a fourth malfunction prevention region 653d respectively arranged on the four side surfaces of the touch region 652.

The four side surfaces of the touch region 652 may be surrounded by the plurality of malfunction prevention regions 653a, 653b, 653c, 653d. The first to fourth malfunction prevention regions 653a, 653b, 653c, 653d may be arranged to be distanced from one another by a specific interval.

The malfunction prevention regions 653a, 653b, 653c, 653d of the input device 650 may consist of a plurality of separate independent touch sensors.

The input device 650 may include a predetermined first touch sensor and a plurality of second touch sensors disposed around the first touch sensor. The upper region of the first touch sensor may correspond to the touch region 652, and the upper regions of the plurality of second touch sensors may correspond to the malfunction prevention regions 653a, 653b, 653c, 653d.

The first touch sensor may be formed as a rectangular shape so as to correspond to the touch region 652. The plurality of second touch sensors may respectively be arranged in locations corresponding to the side surfaces of the touch region 652 so as to correspond to the malfunction prevention regions 653a, 653b, 653c, 653d.

If a touch for at least one malfunction prevention region 653 among the plurality of malfunction prevention regions 653a, 653b, 653c, 653d is detected, the processor 110 may determine that a user operation for the malfunction prevention region 653 was input.

Meanwhile, if a touch for at least two malfunction prevention regions 653 among the plurality of malfunction prevention regions 653a, 653b, 653c, 653d is detected, the processor 110 may determine that a user operation for the malfunction prevention region 653 was input.

Figure 10:
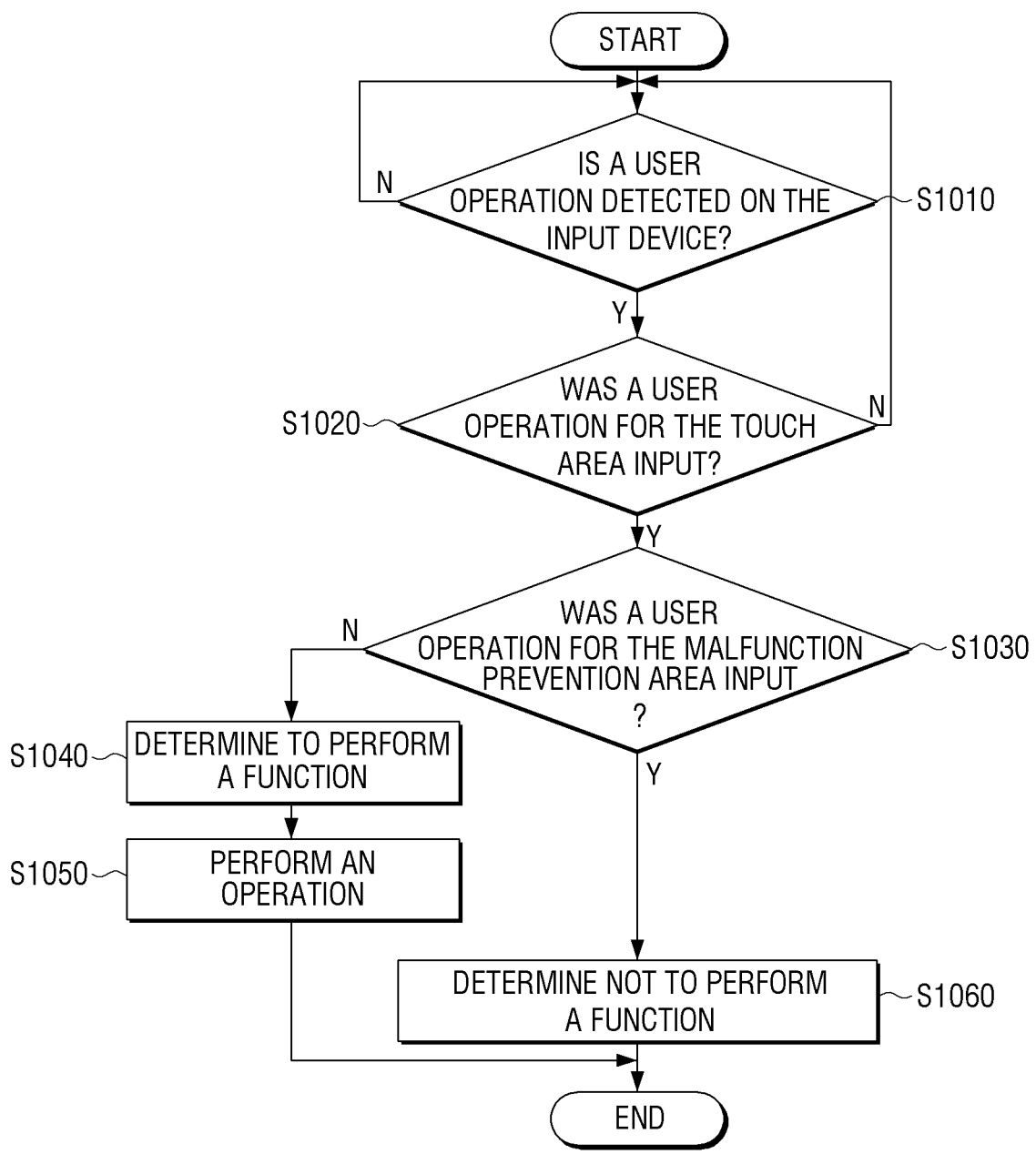
FIG. 10 is a flow chart illustrating an operation flow of a cooking device according to an embodiment of the disclosure.

FIG. 10 is a flow chart illustrating an operation flow of a cooking device according to an embodiment of the disclosure.

Referring to FIG. 10, it is determined whether a user operation is detected on the input device 150 of the cooking device 100 according to an embodiment of the disclosure in operation S1010. A user operation may be determined by whether a touch was detected on the input device 150.

If a user operation was detected, it is determined whether a user operation for the touch region 152 was input in operation S1020. Specifically, it may be determined whether a user operation was input to the touch region 152 through a touched area of the touch region 152 or a touch signal.

For example, if a touched area of the touch region 152 greater than or equal to a specific area is touched, it may be determined that a user operation was input to the touch region 152. Also, if a touch signal having a value greater than or equal to a predetermined first value is detected in the touch region 152, it may be determined that a user operation was input to the touch region 152.

In case the touch region 152 consists of a plurality of touch regions, if all of the plurality of touch regions 152 are touched by an region greater than or equal to a specific area, or a touch signal greater than or equal to the first value is detected, it may be determined that a user operation was input to the touch region 152.

Then, in case a user operation was input to the touch region 152, it is determined whether a user operation for the malfunction prevention region 153 was input in operation S1030. Specifically, for determining whether a user operation for the touch region 152 is by a user's intention, it may be determined whether a user operation was input to the malfunction prevention region 153. Here, if a touched area of the malfunction prevention region 153 greater than or equal to a specific area is touched, it may be determined that a user operation was input to the malfunction prevention region 153.

Also, if a touch signal greater than or equal to a predetermined second value is detected in the malfunction prevention region 153, it may be determined that a user operation was input to the malfunction prevention region 153.

In case the malfunction prevention region 153 consists of a plurality of malfunction prevention regions, if at least one malfunction prevention region 153 among the plurality of malfunction prevention regions 153 is touched by an area greater than or equal to a specific area, or a touch signal greater than or equal to the second value is detected, it may be determined that a user operation was input to the malfunction prevention region 153.

In case the malfunction prevention region 153 consists of a plurality of malfunction prevention regions in a number of three or more, if a touch signal is detected in two or more malfunction prevention regions 153 among the plurality of malfunction prevention regions 153, it may be determined that a user operation was input to the malfunction prevention region 153.

Meanwhile, if it is determined that a user operation was not input to the malfunction prevention region 153, and only a signal for the touch region 152 was detected, the user operation is deemed as a user operation by a user's intention, and it is determined to perform a function command corresponding to the touch region 152 in operation S1040.

If it is determined to perform a function command, the cooking device 100 performs an operation corresponding to the determined function command in operation S1050. Specifically, the cooking device 100 may be turned on or turned off by the function command according to the user operation. The cooking device 100 may operate the heating device 130 or stop the operation of the heating device 130 according to the function command.

Also, by the function command according to the user operation, the cooking device 100 may select the heating device 130 which becomes a subject for adjusting the heating temperature and the heating time among the plurality of heating devices 130. The cooking device 100 may operate the selected heating device 130 or stop the operation of the heating device 130 by the function command.

In contrast, in case it is determined that a user operation was input to the malfunction prevention region 153, it is determined that user operations for the touch region 152 and the malfunction prevention region 153 were input together, and it is determined to not perform a function command corresponding to the touch region 152 in operation S1060.

Accordingly, a malfunction wherein the cooking device 100 operates by an operation not intended by a user can be prevented.

For the cooking device 100 according to an embodiment of the disclosure, a touch method wherein control is performed by a user's touch is used. The input device 150 by such a touch method may include the malfunction prevention region 153 disposed around the touch region 152.

In case user operations for the malfunction prevention region 153 and the touch region 152 were input together, the user operations are deemed as operations by an operation not intended by a user, and it may be determined to not perform a function corresponding to the touch region 152. Accordingly, the cooking device 100 may distinguish whether a function command input through the input device 150 is by a user operation intended by a user, or by an operation not intended by a user or by animals.

That is, the cooking device 100 according to an embodiment of the disclosure recognizes only a user operation intended by a user and performs an operation corresponding to a function command, and thus a safe operation of the cooking device 100 can be implemented.

In the above description, the disclosure was described by an exemplary method. Also, the terms used here are for explanation, and the terms are not intended to be understood as limiting the disclosure. According to the aforementioned content, various amendments and modifications of the disclosure are possible. Accordingly, the disclosure may be implemented freely within the scope of the claims, unless additional mention is made separately.

What is claimed is:

1. A cooking device comprising:
   a heating device to heat a cooking material, the heating device including a plurality of heaters including a first heater and a second heater;
   an input device to receive an input of a function command related to an operation of the first heater and the second heater, respectively, the input device having a plurality of keys including a first key and a second key to respectively control the first heater and the second heater, each of the first key and the second key including:
   a touch region, the touch region including:
   a first touch region; and
   a second touch region separated from the first touch region;
   a plurality of malfunction prevention regions having a shape substantially enclosing the touch region; and
   at least one gap separating the plurality of malfunction prevention regions, the plurality of malfunction prevention regions including:
   a first malfunction prevention region;
   a second malfunction;
   a third malfunction prevention region; and
   a fourth malfunction prevention region, each of the first malfunction prevention region, the second malfunction prevention region, the third malfunction prevention region, and the fourth malfunction prevention region being separated from one another; and
   a processor configured to determine whether to perform the operation related to the function command based on the input received through the input device,
   wherein:
   in response to the determining that only the touch region receives the input, the processor is configured to perform the operation related to the function command on the respective heater of the plurality of heaters;
   in response to the determining that the touch region and at least one of the plurality of malfunction prevention regions receive the input simultaneously, the processor is configured not to perform the operation related to the function command on the respective heater of the plurality of heaters;
   in response to the determining that only the first touch region and the second touch region receive the input, the processor is configured to perform the operation related to the function command on the respective heater of the plurality of heaters;
   in response to the determining that both the first touch region and the second touch region, and one of the first malfunction prevention region, the second malfunction prevention region, the third malfunction prevention region, and the fourth malfunction prevention region, receive the input simultaneously, the processor is configured to perform the operation related to the function command on the respective heater of the plurality of heaters; and in response to the determining that two of the plurality of malfunction prevention regions which are adjacent to each other, receive the input simultaneously, the processor is configured not to perform the operation related to the function command on the respective heater of the plurality of heaters regard regardless of whether any of the first touch region and the second touch region receives the input.

2. The cooking device of claim 1, wherein the input device comprises a touch pad to output a user touch coordinate, and
the touch region is disposed in one region of the touch pad, and the at least one of the plurality of malfunction prevention regions is disposed in an outside region of the one region among the regions of the touch pad.

3. The cooking device of claim 1, wherein the input device comprises:
a first touch sensor having a predetermined shape; and
a second touch sensor disposed around the first touch sensor, and
the touch region is an upper region of the first touch sensor, and the at least one of the plurality of malfunction prevention regions is the upper region of the second touch sensor.

4. The cooking device of claim 3, wherein the first touch sensor and the second touch sensor respectively output a signal value corresponding to an area touched by user, and the processor is configured to:
based on the signal value of the first touch sensor being greater than or equal to a predetermined first value, determine that a user operation for the touch region was input, and
based on the signal value of the second touch sensor being greater than or equal to a second value bigger than the first value, determine that a user operation for the at least one of the plurality of malfunction prevention regions was input.

5. The cooking device of claim 1, wherein the input device comprises:
a first touch sensor having a predetermined shape; and
a plurality of second touch sensors disposed around the first touch sensor, and
the touch region is an upper region of the first touch sensor, and the at least one of the plurality of malfunction prevention regions is the upper region of the plurality of second touch sensors.

6. The cooking device of claim 5, wherein the plurality of second touch sensors are respectively formed to surround a part of an outside of the first touch sensor.

7. The cooking device of claim 5, wherein the plurality of second touch sensors are formed to surround edge regions of the first touch sensor.

8. The cooking device of claim 1, wherein the input device comprises:
a plurality of first touch sensors having a predetermined shape; and
a plurality of second touch sensors disposed around the plurality of first touch sensors, and
the touch region is an upper region of the plurality of first touch sensors, and the at least one of the plurality of malfunction prevention regions is the upper region of the plurality of second touch sensors.

9. The cooking device of claim 8, wherein the processor is configured to:
based on a user touch for the touch region touching all of the plurality of first touch sensors, determine that a user operation for the touch region was input, and
based on a user touch for the at least one of the plurality of malfunction prevention regions touching greater than or equal to a predetermined number among the plurality of second touch sensors, determine that a user operation for the at least one of the plurality of malfunction prevention regions was input.

* * * * *

UNITED STATES PATENT AND TRADEMARK OFFICE
CERTIFICATE OF CORRECTION

| | | |
|---|---|---|
| PATENT NO. | : 11,836,305 B2 | Page 1 of 1 |
| APPLICATION NO. | : 17/284701 | |
| DATED | : December 5, 2023 | |
| INVENTOR(S) | : Youngwoong Joo et al. | |

It is certified that error appears in the above-identified patent and that said Letters Patent is hereby corrected as shown below:

In the Claims

Column 19, Line 6:
In Claim 1, before "regardless" delete "regard".

Signed and Sealed this
Twenty-third Day of January, 2024

*Katherine Kelly Vidal*

Katherine Kelly Vidal
*Director of the United States Patent and Trademark Office*